United States Patent
Lee

(10) Patent No.: US 11,650,827 B2
(45) Date of Patent: May 16, 2023

(54) TOUCH SENSING INTEGRATED CIRCUIT SYSTEM, TOUCH SENSING SYSTEM, AND METHOD FOR WRITING FIRMWARE

(71) Applicant: SILICON WORKS CO., LTD., Daejeon (KR)

(72) Inventor: Gyu Chul Lee, Daejeon (KR)

(73) Assignee: SILICON WORKS CO., LTD., Daejeon (KR)

( * ) Notice: Subject to any disclaimer, the term of this patent is extended or adjusted under 35 U.S.C. 154(b) by 49 days.

(21) Appl. No.: 17/121,001

(22) Filed: Dec. 14, 2020

(65) Prior Publication Data

US 2021/0182076 A1 Jun. 17, 2021

(30) Foreign Application Priority Data

Dec. 16, 2019 (KR) .................. 10-2019-0167986

(51) Int. Cl.
G06F 9/44 (2018.01)
G06F 9/4401 (2018.01)
G06F 3/041 (2006.01)

(52) U.S. Cl.
CPC .......... *G06F 9/4403* (2013.01); *G06F 3/0416* (2013.01)

(58) Field of Classification Search
CPC .................. G06F 9/4403; G06F 3/0416
See application file for complete search history.

(56) References Cited

U.S. PATENT DOCUMENTS

| | | | | |
|---|---|---|---|---|
| 6,970,960 | B1* | 11/2005 | Sarfati | H04N 21/4345 710/106 |
| 10,042,785 | B1* | 8/2018 | Buch | G06F 3/0689 |
| 2002/0138225 | A1* | 9/2002 | Wong | G06F 9/4405 702/119 |
| 2007/0288722 | A1* | 12/2007 | Ando | G06F 15/177 712/31 |
| 2012/0256852 | A1* | 10/2012 | Van Antwerpen | G06F 3/0416 345/173 |
| 2014/0330999 | A1* | 11/2014 | Glickman | G06F 13/4022 710/306 |
| 2016/0161968 | A1* | 6/2016 | Kim | H01L 23/481 327/540 |
| 2016/0350024 | A1* | 12/2016 | Kuga | G06F 13/28 |
| 2017/0132166 | A1* | 5/2017 | Jiang | G06F 13/4068 |
| 2019/0155479 | A1* | 5/2019 | Ling | G06F 3/0488 |
| 2020/0064880 | A1* | 2/2020 | Roberson | G06F 1/12 |

FOREIGN PATENT DOCUMENTS

| | | |
|---|---|---|
| JP | 4817115 B2 | 11/2011 |
| JP | 2014-044545 A | 3/2014 |
| JP | 2019-511376 A | 4/2019 |

* cited by examiner

*Primary Examiner* — Danny Chan

(74) *Attorney, Agent, or Firm* — Rothwell, Figg, Ernst & Manbeck, P.C.

(57) ABSTRACT

An embodiment is able to simplify the design and manufacturing process by unifying the step of writing boot loaders to the integrated circuits.

10 Claims, 8 Drawing Sheets

TOUCH SENSING INTEGRATED CIRCUIT SYSTEM, TOUCH SENSING SYSTEM, AND METHOD FOR WRITING FIRMWARE

CROSS REFERENCE TO RELATED APPLICATION

This application claims priority from Republic of Korea Patent Application No. 10-2019-0167986, filed on Dec. 16, 2019, which is hereby incorporated by reference in its entirety.

BACKGROUND

1. Field of Technology

The present embodiment relates a technology for writing firmware in an integrated circuit for touch sensing.

2. Description of the Prior Art

A screen of an electronic device may be an area for receiving an input, as well as for displaying an image. In order for the screen of an electronic device to receive an input, a touch sensing technology for recognizing a touch or proximity of an external object is used. A touch panel inside the electronic device is placed at the same position as the display panel on a plane. Therefore, users are able to input user manipulation signals using the touch panel while viewing the image on the display panel. This method of generating user manipulation signals provides remarkable user intuition compared to other existing methods of inputting user manipulation signals (e.g., input through a mouse or input through a keyboard).

In general, electronic devices include a plurality of integrated circuits for sensing a touch or proximity, and the plurality of integrated circuits may perform individual functions for touch sensing. One integrated circuit may operate as a master, and another integrated circuit may operate as a slave. Each of the plurality of integrated circuits may include a microprocessor and a memory, and the microprocessor may access a memory in which a boot loader and firmware suitable for each function (e.g., a master function or a slave function) are written and stored, and may execute the boot loader and firmware whenever the integrated circuit is driven.

Thus, before an integrated circuit for touch sensing is initially driven in the electronic device, a boot loader and firmware suitable for the function assigned to the integrated circuit must be written to the memory of the integrated circuit. In order to manufacture an integrated circuit for touch sensing, it is necessary to classify integrated circuits by functions, develop respective boot loaders and firmware according to the functions, and write the boot loaders and firmware so as to correspond to the integrated circuits classified by the functions.

However, this process may lead to complicated design of the integrated circuits, considering that the integrated circuit must be designed differently depending on the function. In addition, this process requires separate management for the integrated circuit for each function, and development and writing of a boot loader and firmware for each function, so the manufacturing process of the integrated circuit will be complicated, and a risk in the manufacturing process will be increased.

SUMMARY

The present embodiment is to provide a technique for facilitating design and manufacturing processes by improving a method of writing or operating boot loaders and firmware for the integrated circuits.

An aspect of the present embodiment is to provide a technique for writing a boot loader capable of operating both as a master and as a slave to integrated circuits at once and then writing firmware suitable for a function.

In view of the foregoing, an embodiment provides an integrated circuit system including: a first nonvolatile memory and a second nonvolatile memory that store a common boot loader capable of executing a first function and a second function; a first integrated circuit that configures the common boot loader to execute a first function; and a second integrated circuit that configures the common boot loader to execute a second function, wherein first firmware corresponding to the first function is stored in the first nonvolatile memory together with the common boot loader configured as the first function, and wherein second firmware corresponding to the second function is stored in the second nonvolatile memory together with the common boot loader configured as the second function.

In the integrated circuit system, the first integrated circuit and the second integrated circuit may receive a selection signal for determining to configure the common boot loader as the first function or the second function.

In the integrated circuit system, the first integrated circuit may receive a first selection signal for determining that the common boot loader is to execute the first function, and may configure the common boot loader according to the first selection signal.

In the integrated circuit system, the second integrated circuit may receive a second selection signal for determining that the common boot loader is to execute the second function, and may configure the common boot loader according to the second selection signal.

In the integrated circuit system, the first integrated circuit and the second integrated circuit may be microcontroller units (MCUs), the first function may include that any one of the first integrated circuit and the second integrated circuit functions as a master, and the second function may include that the remaining one of the first integrated circuit and the second integrated circuit functions as a slave.

In the integrated circuit system, the first integrated circuit may communicate with a host and the second integrated circuit on the basis of the common boot loader configured as the first function and the first firmware.

In the integrated circuit system, the second integrated circuit may communicate with the first integrated circuit on the basis of the common boot loader configured as the second function and the second firmware.

In the integrated circuit system, the common boot loader may include identification data in a binary form indicating characteristics.

In the integrated circuit system, the common boot loader configured as the first function and the common boot loader configured as the second function may include the same identification data.

Another embodiment provides a method for writing firmware to an integrated circuit system including a first nonvolatile memory, a first integrated circuit accessible to the first nonvolatile memory, a second nonvolatile memory, and a second integrated circuit accessible to the second nonvolatile memory, which includes the steps of: storing a boot loader capable of performing a plurality of functions in the first nonvolatile memory and the second nonvolatile memory, respectively; causing the first integrated circuit to configure a boot loader stored in the first nonvolatile memory to perform one function among the plurality of functions; causing the second integrated circuit to configure a boot loader stored in the second nonvolatile memory to perform another function among the plurality of functions; storing firmware corresponding to the one function in the first nonvolatile memory; and storing firmware corresponding to the remaining one function in the second nonvolatile memory.

In the method, the step of configuration of the first integrated circuit may include receiving a first selection signal for determining one function, among the plurality of functions of the boot loader, and configuring the boot loader according to the first selection signal, and the one function may include a function as a master microcontroller unit.

In the method, the step of configuration of the second integrated circuit may include receiving a second selection signal for determining another function, among the plurality of functions of the boot loader, and configuring the boot loader according to the second selection signal, and the another function may include a function as a slave microcontroller unit.

In the method, the boot loader may include a common boot loader that is applicable to both the first integrated circuit and the second integrated circuit, and in the step of storing the boot loader, the common boot loader may be stored both in the first nonvolatile memory and in the second nonvolatile memory at once.

In the method, in the step of storing the firmware of the one function, the firmware of the one function may be stored after the first integrated circuit has configured the boot loader stored in the first nonvolatile memory as the one function, and in the step of storing the firmware of the another function, the firmware of the another function may be stored after the second integrated circuit has configured the boot loader stored in the second nonvolatile memory as the another function.

Another embodiment provides a touch sensing system for sensing a touch or proximity of an external object, which includes: a touch sensing device comprising a touch driving circuit configured to generate touch data on whether or not the touch or proximity is present and a touch control circuit configured to receive the touch data and determine the touch or proximity from the touch data; and a nonvolatile memory configured to store a common boot loader that performs a plurality of functions for determining the touch or proximity and firmware that corresponds to any one function, among the plurality of functions, wherein the touch control circuit includes a first touch control circuit configured to receive the touch data from the touch driving circuit and a second touch control circuit configured to control the first touch control circuit, and wherein the first touch control circuit and the second touch control circuit configures the common boot loader stored in the nonvolatile memory as the any one function and operates on the basis of the configured common boot loader and the firmware.

The second touch control circuit may calculate touch coordinates.

Another embodiments provides a touch sensing integrated circuit system including: a first nonvolatile memory and a second nonvolatile memory configured to store a common boot loader; a first integrated circuit that configures the common boot loader to operate as a master; and a second integrated circuit that configures the common boot loader to operate as a slave, wherein firmware to operate as a master is stored in the first nonvolatile memory together with the common boot loader, and wherein firmware to operate as a slave is stored in the second nonvolatile memory together with the common boot loader.

The first integrated circuit and the second integrated circuit may configure the common boot loader according to received selection signals.

The first integrated circuit and the second integrated circuit may be microcontroller units (MCUs).

The first integrated circuit may receive data on touch sensing from the second integrated circuit, and transmit data on touch coordinates to a host using the data on the touch sensing. A plurality of first integrated circuits operating as slaves may be disposed in one touch panel. The second integrated circuit may generate data for touch coordinates after receiving and collecting data on touch sensing from the plurality of first integrated circuits. In addition, the second integrated circuit may transmit data on the touch coordinates to a host.

The first integrated circuit and the second integrated circuit may generate data on the touch sensing for different areas in a touch panel. The second integrated circuit may generate data on touch sensing while performing sensing in one area of the touch panel. In addition, the second integrated circuit may collect the data received from the first integrated circuit and the data generated by the second integrated circuit, thereby generating data on touch coordinates.

The common boot loader may include identification data in a binary form indicating characteristics.

The common boot loader configured as a master and the common boot loader configured as a slave may include the same identification data.

The first integrated circuit and the second integrated circuit may download the firmware from the host. In the manufacturing process, the same common boot loader may be downloaded to a nonvolatile memory corresponding to the first integrated circuit and a nonvolatile memory corresponding to the second integrated circuit. Thereafter, when the first integrated circuit and the second integrated circuit are driven, firmware may be downloaded to suit each function.

As described above, according to the present embodiment, it is possible to simplify the design and manufacturing process by unifying the step of writing boot loaders to the integrated circuits.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
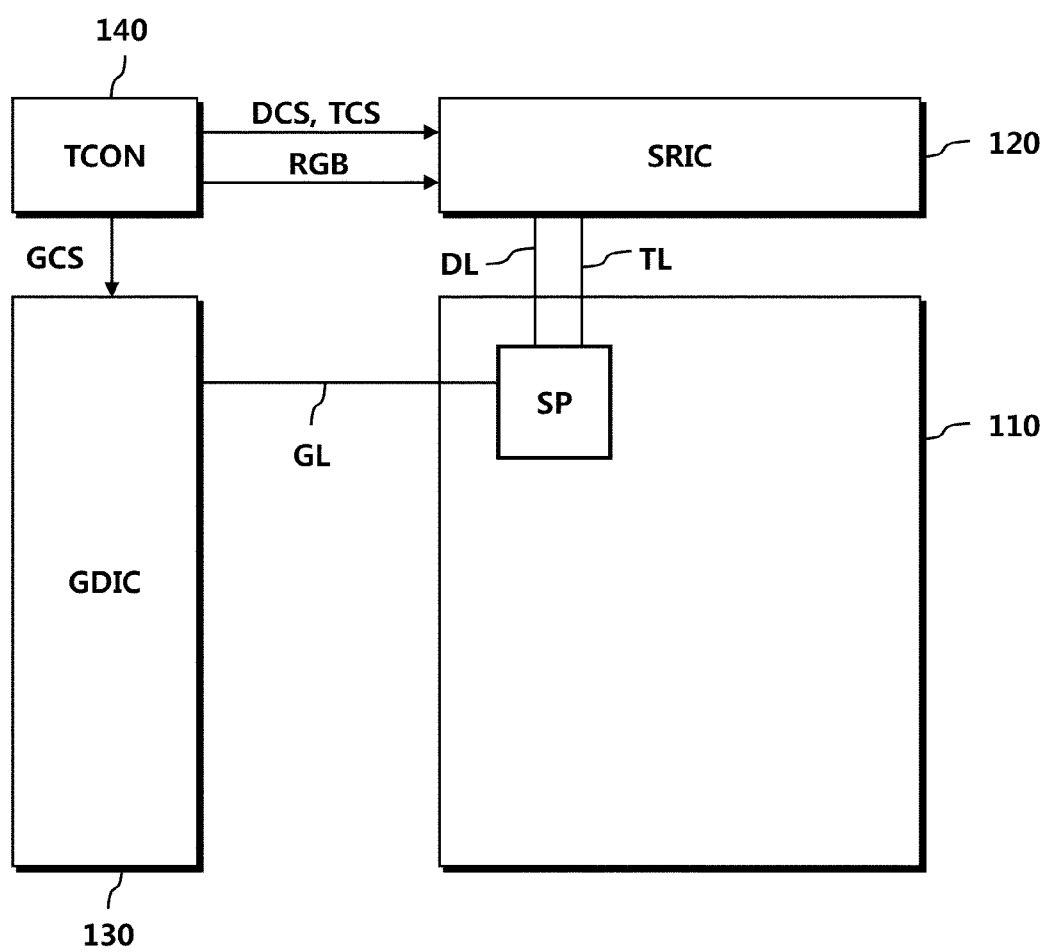
FIG. 1 is a block diagram of a display device according to an embodiment.

FIG. 1 is a block diagram of a display device according to an embodiment.

Referring to FIG. 1, the display device 100 may include a panel 110, a source readout IC (SRIC) 120, a gate driving IC (GDIC) 130, and a timing controller (TCON) 140.

The panel 110 may have a plurality of data lines DL and a plurality of gate lines GL, which are arranged thereon, and may have a plurality of pixels arranged thereon. The pixel may include a plurality of subpixels SP. Here, the subpixel may be R (red), G (green), B (blue), W (white), or the like. One pixel may be configured as subpixels SP of RGB, subpixels SP of RGBG, subpixel SP of RGBW, or the like. Hereinafter, for convenience of description, it will be described that one pixel includes subpixels SP of RGB.

The source readout IC 120, the gate driving IC 130, and the timing controller 140 are devices that generate signals for displaying an image on the panel 110.

The gate driving IC 130 may supply gate driving signals of a turn-on voltage or a turn-off voltage to the gate lines GL. When a gate driving signal of a turn-on voltage is supplied to the subpixel SP, the subpixel SP is connected to the data line DL. In addition, when the gate driving signal of a turn-off voltage is supplied to the subpixel SP, the connection between the subpixel SP and the data line DL is released.

The source readout IC 120 may include a source driver therein. The source driver may supply data voltages to the subpixels SP through the data lines DL. The data voltage supplied to the data line DL may be supplied to the subpixel SP according to the gate driving signal.

In addition, the source readout IC 120 may include a readout IC (ROIC) therein. The readout IC may be embedded in the source readout IC 120 together with a source driver. The readout IC may sense a touch input by driving electrodes around the subpixel SP. The source readout IC 120 may drive electrodes through the touch lines TL, and may receive analog signals from the electrodes.

The source readout IC 120 may be connected to a bonding pad of the panel 110 by a tape automated bonding (TAB) type or a chip-on-glass (COG) type, or may be formed directly on the panel 110, or, in some embodiments, may be formed to be integrated to the panel 110. In addition, the source readout IC 120 may be implemented by a chip-on-film (COF) type.

The timing controller 140 may supply control signals to the gate driving IC 130 and the source readout IC 120. For example, the timing controller 140 may transmit a gate control signal GCS for initiating scanning to the gate driving IC 130. In addition, the timing controller 140 may output image data RGB to the source readout IC 120. In addition, the timing controller 140 may transmit a data control signal DCS for controlling the source readout IC 120 to supply a data voltage to each subpixel SP. In addition, the timing controller 140 may transmit a touch control signal TCS for controlling the source readout IC 120 to sense a touch input by driving an electrode of each subpixel SP.

Figure 2:
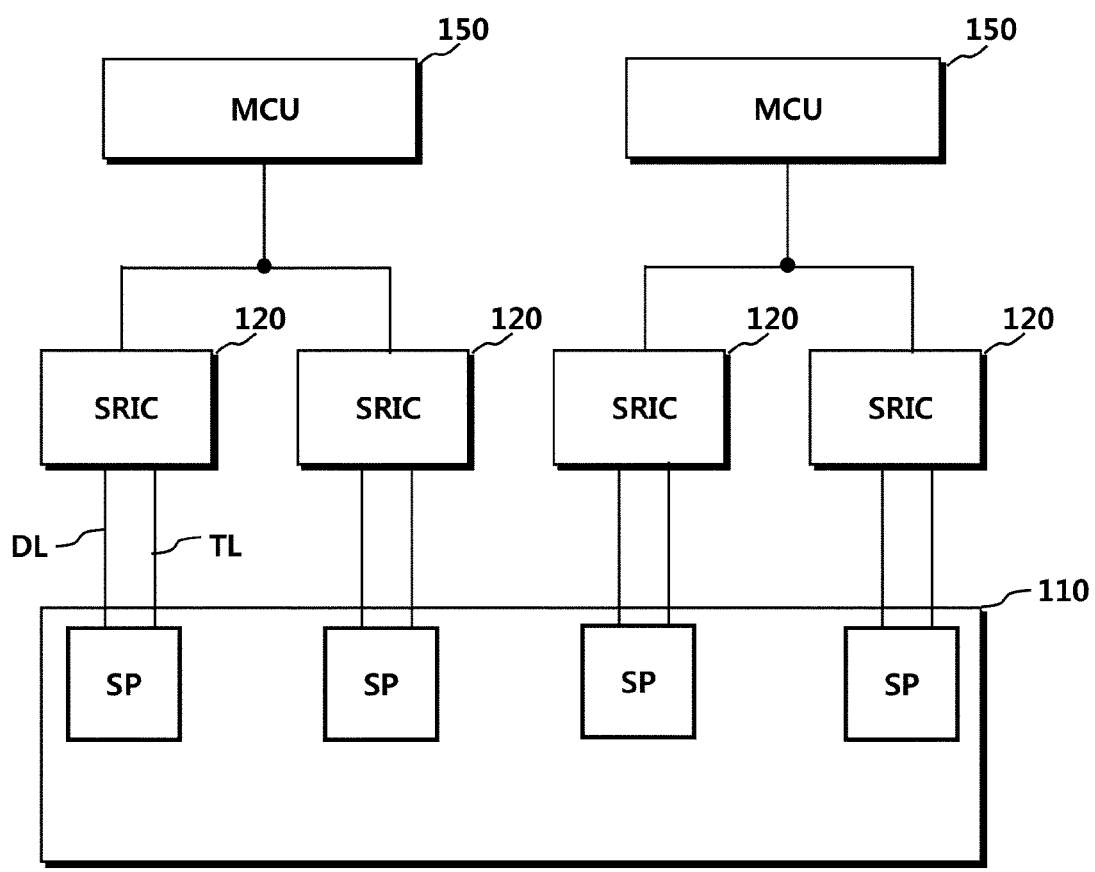
FIG. 2 is a diagram illustrating connections of a microcontroller unit, a source readout integrated circuit (IC), and a panel in a display device according to an embodiment.

FIG. 2 is a diagram illustrating connections of a microcontroller unit, a source readout IC, and a panel in a display device according to an embodiment.

Referring to FIG. 2, the display device 100 according to an embodiment may further include a microcontroller unit (MCU) 150. A plurality of microcontroller units 150 and a plurality of source readout ICs (SRIC) 120 may be configured and included in the display device 100.

The microcontroller unit 150 may be connected to a single source readout IC 120 or a plurality of source readout ICs 120. A plurality of groups including the microcontroller unit 150 and the source readout ICs 120, which are connected to each other, may be included in the display device 100.

The microcontroller unit 150 and the source readout IC 120 may communicate with each other on the basis of a serial peripheral interface (SPI) scheme or an inter-integrated circuit (I2C) scheme.

Each microcontroller unit 150 may be electrically connected to and communicate with a plurality of source readout ICs 120. For example, one microcontroller unit 150 may be connected to two source readout ICs 120. Each microcontroller unit 150 may control a plurality of source readout ICs 120, and may receive data (e.g., touch data) from the plurality of source readout ICs 120.

The respective source readout ICs 120 divide the panel 110 into areas, and manage the divided areas. The source readout IC 120 may output image data to the subpixels SP through the data lines DL. Alternatively, the source readout IC 120 may drive electrodes through the touch lines TL, thereby sensing an input for a touch or proximity of an external object. In addition, each source readout IC 120 may transmit data (e.g., touch data) to the microcontroller unit 150 connected thereto.

Figure 3:
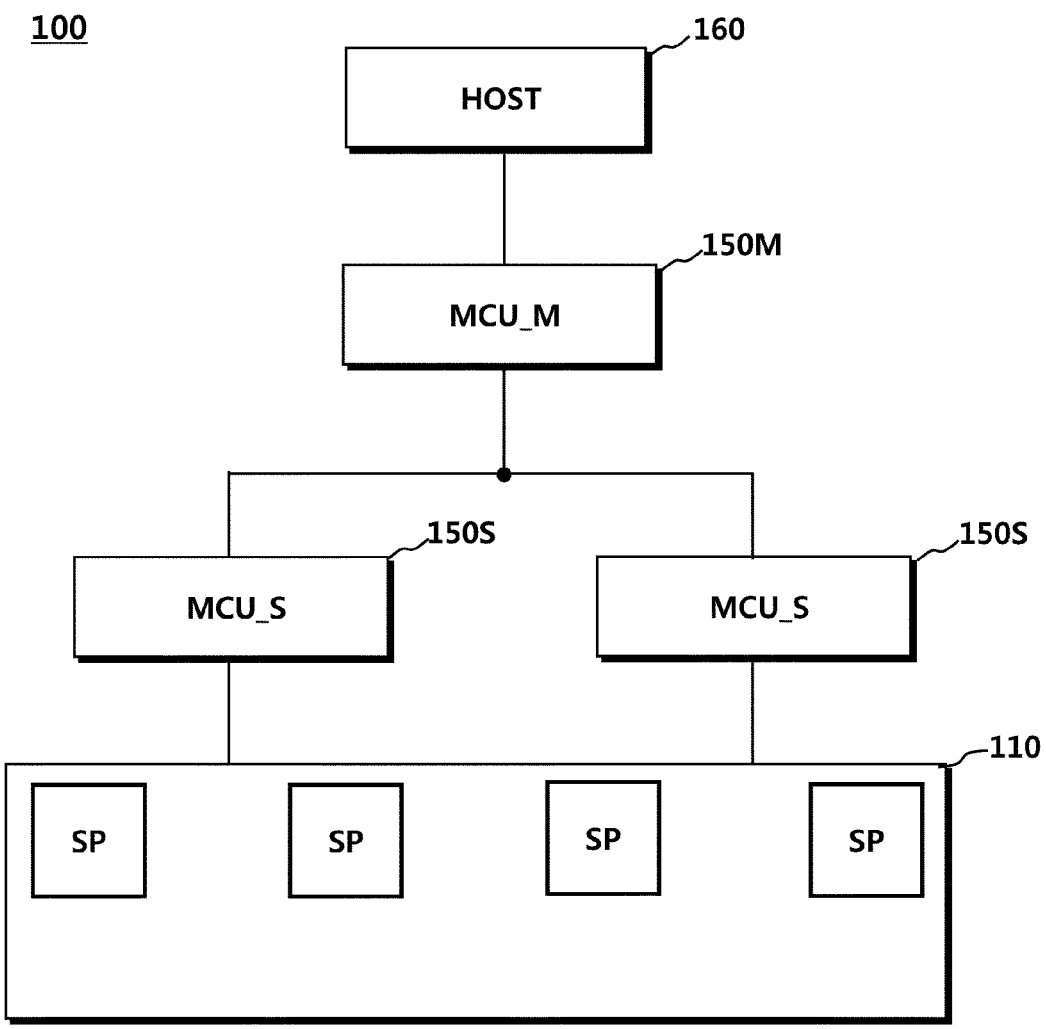
FIG. 3 is a diagram illustrating a master-slave structure of a microcontroller unit according to an embodiment.

FIG. 3 is a diagram illustrating a master-slave structure of a microcontroller unit according to an embodiment.

Referring to FIG. 3, a display device 100 including a plurality of microcontroller units 150M (MCU_M) and 150S (MCU_S), excluding a plurality of source readout ICs, is illustrated for convenience of description.

The plurality of microcontroller units 150M and 150S may have a master-slave structure. One master microcontroller unit 150M may be connected to a plurality of slave microcontroller units 150S. The master microcontroller unit 150M may be connected to and communicate with a host 160.

The master microcontroller unit 150M may perform the following functions. The master microcontroller unit 150M may communicate with the host 160 or the slave microcontroller unit 150S. The master microcontroller unit 150M may perform a cyclic redundancy check (CRC) in order to prevent errors in data transmitted from the master microcontroller unit 150M. In addition, the master microcontroller unit 150M may check the state of the slave microcontroller unit 150S.

Meanwhile, the slave microcontroller unit 150S may perform the following functions. The slave microcontroller unit 150S may communicate with the master microcontroller unit 150M. The slave microcontroller unit 150S may perform a CRC in order to prevent errors in data transmitted from the slave microcontroller unit 150S.

In FIG. 3, although the master-slave structure of a plurality of microcontroller units 150M and 150S includes a hierarchical structure in which one master microcontroller unit 150M controls a plurality of slave microcontroller units 150S, the master-slave structure is not limited thereto, and may include a horizontal structure. That is, there may not be a higher microcontroller unit 150M controlling a lower microcontroller unit 150S, and one of a plurality of lower microcontroller units 150S for driving the panel may be a master, and the remaining one may be a slave.

Meanwhile, the display device 100 may further include a host 160.

The host 160 may be a main controller of the display device 100. For example, in the case where the display device 100 is a mobile communication terminal, the host 160 may be an application processor (AP) of the mobile communication terminal, and in the case where the display device 100 is a television (TV), the host 160 may be a core processor of the TV.

Figure 4:
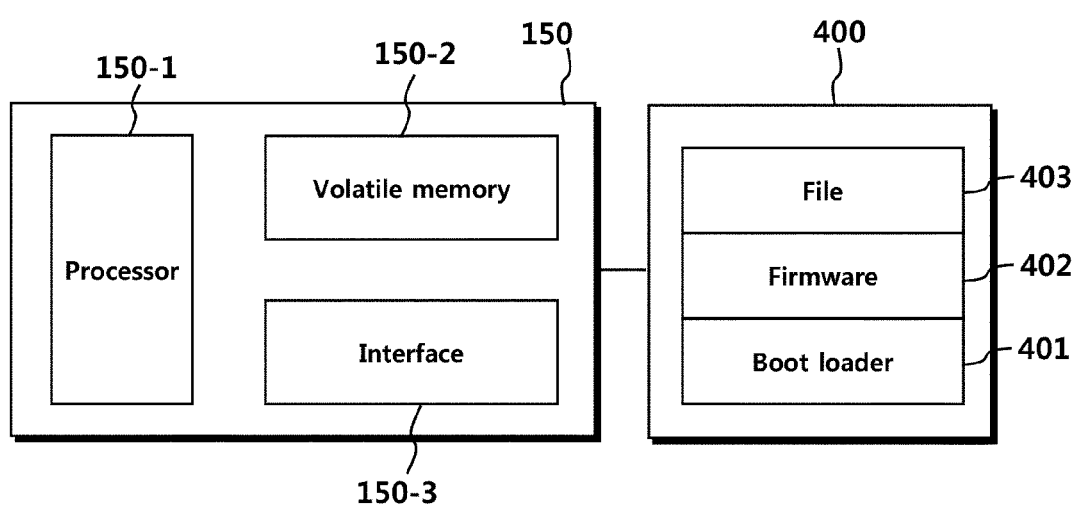
FIG. 4 is a block diagram of a microcontroller unit according to an embodiment.

FIG. 4 is a block diagram of a microcontroller unit according to an embodiment.

Referring to FIG. 4, the microcontroller unit 150 may include a processor 150-1, a volatile memory 150-2, and an interface 150-3. The microcontroller unit 150 may use data stored in a nonvolatile memory 400.

Data (e.g., programs) may be stored in the nonvolatile memory 400. A boot loader 401, firmware 402, and a file 403 may be stored in areas allocated thereto in the nonvolatile memory 400.

The processor 150-1 may read data stored in the nonvolatile memory 400, or may execute programs. The processor 150-1 may access the nonvolatile memory 400 through the interface 150-3, and may execute the boot loader 401, the firmware 402, and the file 403 stored in the nonvolatile memory 400.

Specifically, when the microcontroller unit 150 starts to operate, the processor 150-1 may read the boot loader 401, and may load the same to the volatile memory 150-2. The processor 150-1 may obtain information on the firmware 402 to be executed later (e.g., a type or a memory address) through the boot loader 401. The processor 150-1 may read the firmware 402, and may load the same to the volatile memory 150-2. When the processor 150-1 is ready for driving by executing the boot loader 401 and the firmware 402, the processor 150-1 may execute the file 403 for actual driving.

The volatile memory 150-2 may temporarily store the data read from the nonvolatile memory 400 by the processor 150-1. Here, temporary storage may indicate that the data is lost from the volatile memory 150-2 when power is cut off. On the other hand, the nonvolatile memory 400 (e.g., a flash memory) may permanently store data. Here, permanent storage may indicate that the data is preserved in the nonvolatile memory 400 even when power is cut off.

The boot loader 401 may include an algorithm that causes the microcontroller unit 150 to perform a plurality of functions. For example, the algorithm of the boot loader 401 may relates to whether the microcontroller unit 150 operates as a master microcontroller unit or a slave microcontroller unit in order to sense a touch or proximity of an external object.

The firmware 402 may include an algorithm for executing one of a plurality of functions executable by the boot loader 401. For example, when the boot loader 401 is configured to operate the microcontroller unit 150 as a master, the firmware 402 may include an algorithm for executing a master function.

Here, the firmware 402 may implement the functions of the microcontroller unit 150 by being executed together with the boot loader 401 by the processor 150-1. The functions implemented by the firmware 402 may differ depending on the functions configured in the boot loader 401. In addition, the firmware 402 may be executed after the boot loader 401 has been executed.

Figure 5:
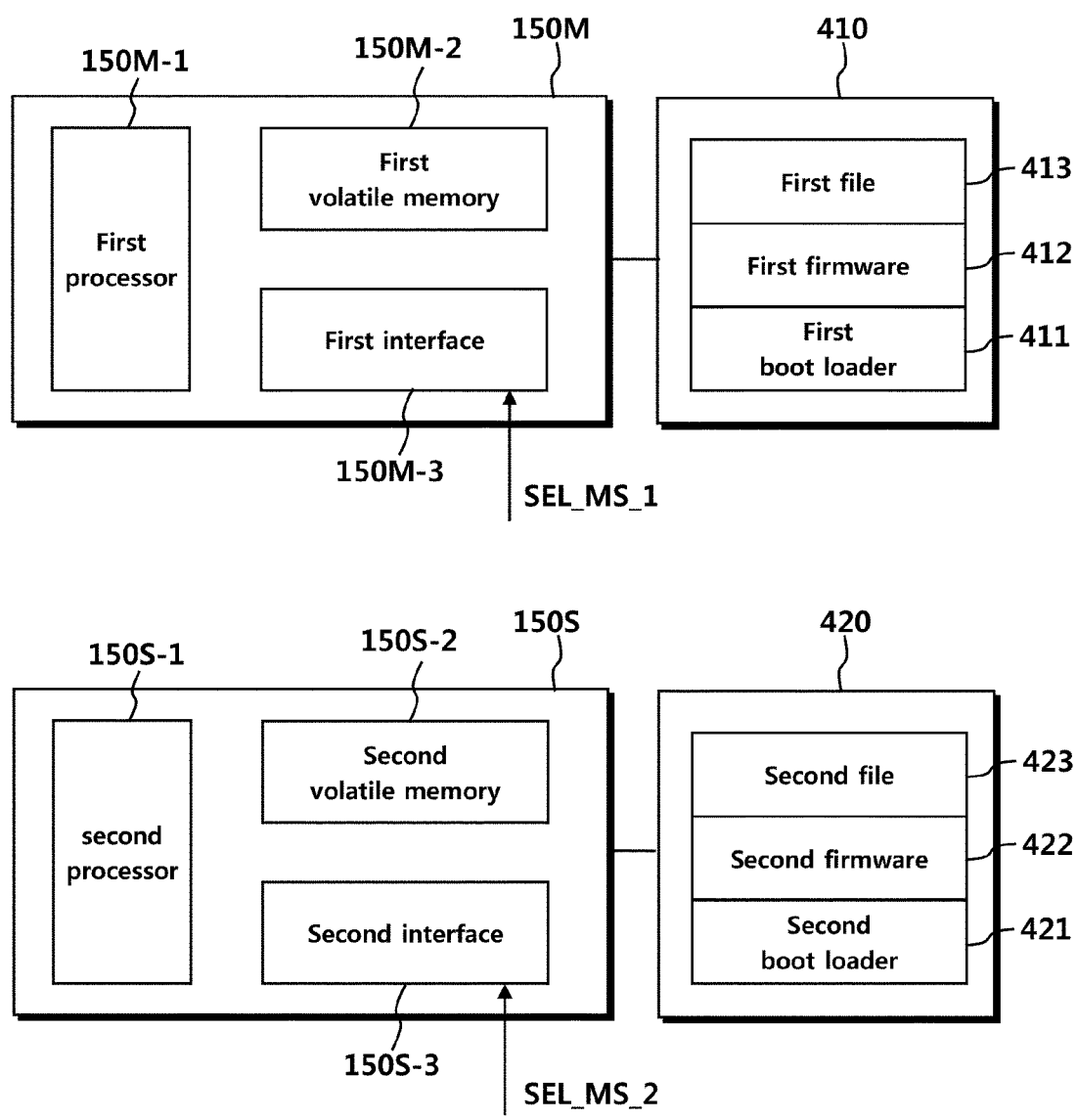
FIG. 5 illustrates block diagrams of a master microcontroller unit and a slave microcontroller unit according to an embodiment.

FIG. 5 illustrates block diagrams of a master microcontroller unit and a slave microcontroller unit according to an embodiment.

Referring to FIG. 5, a microcontroller unit for sensing a touch input to a display device may function as a master or a slave. A master microcontroller unit 150M may be a microcontroller unit that functions as a master, and a slave microcontroller unit 150S may be a microcontroller unit that functions as a slave.

The function executed by the microcontroller unit may vary depending on the configuration of a boot loader read by the microcontroller unit. The boot loader may include various types of algorithms that allow the microcontroller unit to perform a plurality of functions, and the functions of the microcontroller unit may be determined according to the algorithm implemented in the boot loader. Here, the function implemented by the boot loader may be determined by an external signal.

The master microcontroller unit 150M for sensing a touch as a master may include a first processor 150M-1, a first volatile memory 150M-2, and a first interface 150M-3. In addition, the master microcontroller unit 150M may access a first nonvolatile memory 410, and may execute a first boot loader 411, a first firmware 412, and a first file 413.

The first boot loader 411 may be configured to perform a master function among a plurality of functions. The configuring may indicate customizing or optimizing the first boot loader 411 to a master function.

The first boot loader 411 may be configured by a first selection signal SEL_MS_1. The first selection signal SEL_MS_1 may include information for determining the function implemented by the first boot loader 411, among a plurality of functions.

Specifically, the first processor 150M-1 may receive a first selection signal SEL_MS_1 from the outside through the first interface 150M-3. The first processor 150M-1 may load the first boot loader 411 into the first volatile memory 150M-2, and may then configure the first boot loader 411 according to the first selection signal SEL_MS_1.

For example, if the first selection signal SEL_MS_1 includes information on a master function for touch sensing, the first processor 150M-1 may configure the first boot loader 411 such that the first boot loader 411 performs a master function. Then, the master microcontroller unit 150M may operate as a master.

If the first boot loader 411 is configured as a master function, and if there is first firmware 412 that implements a master function together with the first boot loader 411, the master microcontroller unit 150M may operate as a master.

Specifically, when the master microcontroller unit 150M starts operation, the first processor 150M-1 may load the first boot loader 411 into the first volatile memory 150M-2, and may execute the same. The first processor 150M-1 may load the first firmware 412 into the first volatile memory 150M-2 through the first boot loader 411, and may execute the same. Thereby, the master microcontroller unit 150M may complete the preparation for master operation. If the first processor 150M-1 loads the first file 413 into the first volatile memory 150M-2 and executes the same, the master microcontroller unit 150M may start the master operation.

Likewise, the slave microcontroller unit 150S for sensing a touch as a slave may include a second processor 150S-1, a second volatile memory 150S-2, and a second interface 150S-3. In addition, the slave microcontroller unit 150S may access the second nonvolatile memory 420 to execute a second boot loader 421, a second firmware 422, and a second file 423.

The second boot loader 421 may be configured to perform a slave function among the plurality of functions. The configuring may indicate customizing or optimizing the second boot loader 421 to a slave function.

The second boot loader 421 may be configured by a second selection signal SEL_MS_2. The second selection signal SEL_MS_2 may include information for determining the function implemented by the second boot loader 421, among the plurality of functions.

Specifically, the second processor 150S-1 may receive a second selection signal SEL_MS_2 from the outside through the second interface 150S-3. The second processor 150S-1 may load the second boot loader 421 into the second volatile memory 150S-2, and may then configure the second boot loader 421 according to the second selection signal SEL_MS_2.

For example, if the second selection signal SEL_MS_2 includes information on a slave function for touch sensing, the second processor 150S-1 may configure the second boot loader 421 such that the second boot loader 421 performs a slave function. Then, the slave microcontroller unit 150S may operate as a slave.

Figure 6:
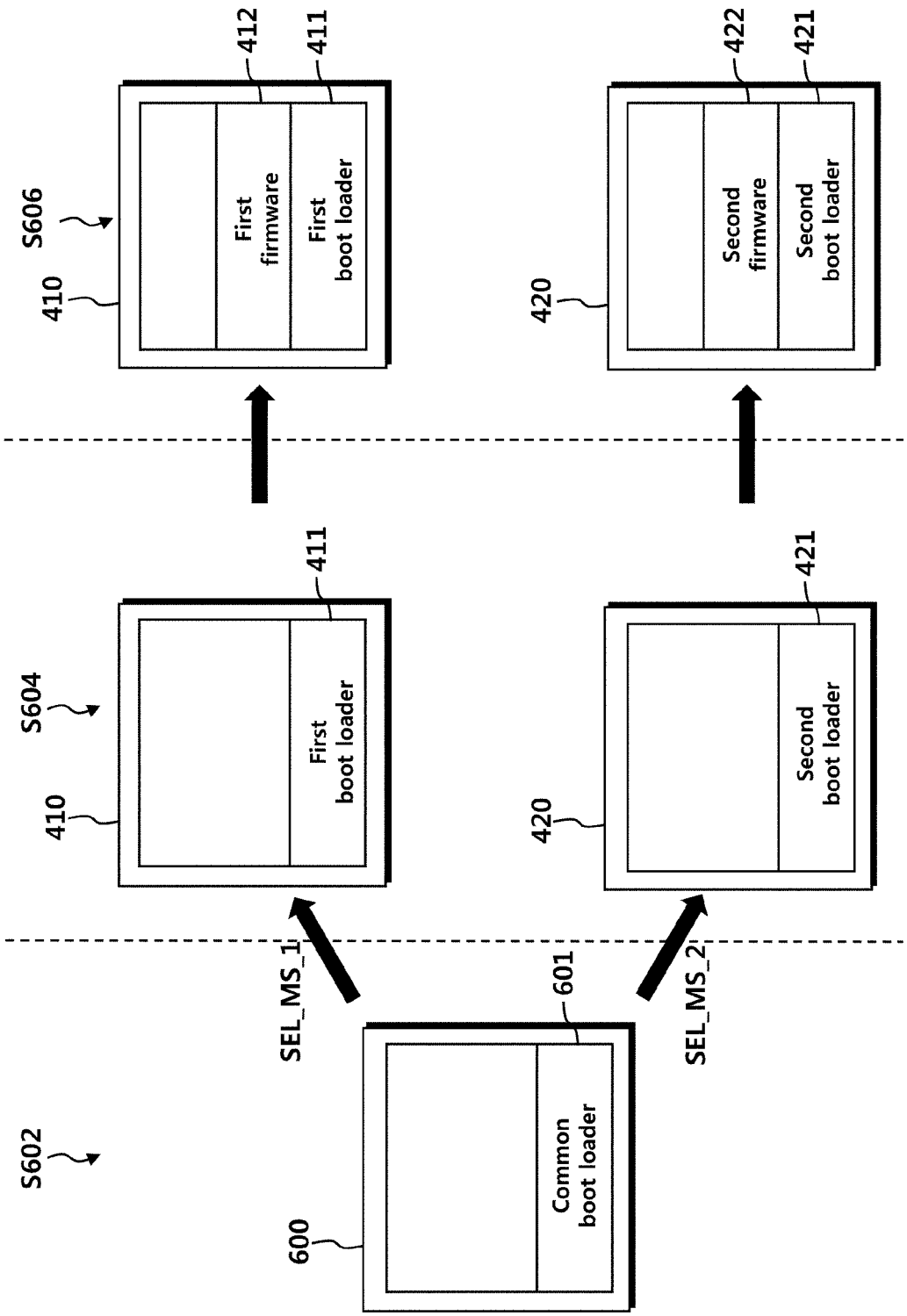
FIG. 6 is a flowchart illustrating a process of writing a boot loader and firmware to a nonvolatile memory such that an integrated circuit for a microcontroller unit operates as a master or a slave according to an embodiment.

FIG. 6 is a flowchart illustrating a process of writing a boot loader and firmware to a nonvolatile memory such that an integrated circuit for a microcontroller unit operates as a master or slave according to an embodiment.

Referring to FIG. 6, write and store processes may differ between the boot loader and the firmware, which determine a function of a microcontroller unit. Writing and storing of the boot loader to the nonvolatile memory may go through a unified process, whereas writing and storing of the firmware to the volatile memory may go through a binary process.

In the unified write process of the boot loader, a common boot loader 601 may be written to a nonvolatile memory 600 accessible by an integrated circuit for a microcontroller unit (S602).

The integrated circuit for a microcontroller unit may be an integrated circuit that operates as a microcontroller unit, but has not yet been determined as to the specific function thereof to be executed. For example, the microcontroller unit for touch sensing may be a master microcontroller unit that functions as a master, or may be a slave microcontroller unit that functions as a slave, but the integrated circuit may be in the state in which the function thereof has not yet been determined to be a master or a slave.

Accordingly, in step S602, the common boot loader 601 capable of performing a plurality of functions may be written and stored in the nonvolatile memory 600 accessible by the integrated circuit for a microcontroller unit. For example, the plurality of functions may include a master function and a slave function.

Since the function to be implemented by the integrated circuit for a microcontroller unit has not yet been determined, the common boot loader 601 capable of performing any function may be written to the nonvolatile memories 600 accessible by all integrated circuits for a microcontroller unit at once. That is, regardless of whether a certain integrated circuit functions as a master microcontroller unit or a slave microcontroller unit later, a boot loader capable of performing both functions is pre-included in the nonvolatile memories 600 of all integrated circuits.

Accordingly, the functions of the integrated circuits do not need to be determined in advance, and a single type of boot loader (e.g., the common boot loader 601) may be written to the nonvolatile memories 600 accessible by the integrated circuits at once. If the common boot loader 601 is written at once regardless of the function of the integrated circuit, that is, before the function of the integrated circuit is determined, the manufacturing process is able to be simplified.

If the function of the integrated circuit is predetermined, a boot loader according to each function must be developed and prepared separately, and each boot loader must be separately written to the nonvolatile memory 600 of the integrated circuit according to each function. Step S602 is performed in the process of manufacturing the integrated circuit, and if the boot loader is individually written in consideration of the function of the integrated circuit, that is, after the function of the integrated circuit has been determined, the manufacturing process may be complicated.

During the diversified write process of the firmware, the integrated circuit for a microcontroller unit may be determined to perform one of a master function and a slave function, and may thus configure a boot loader that the integrated circuit is able to access as the determined function (S604).

For example, one of the integrated circuits for a microcontroller unit may receive a first selection signal SEL_MS_1. The one integrated circuit may configure the common boot loader 601 as a master function in order to operate as a master microcontroller unit according to the first selection signal SEL_MS_1. Here, the common boot loader 601 configured to perform a master function may be defined as a "first boot loader 411".

In addition, another integrated circuit, among the integrated circuits for a microcontroller unit, may receive a second selection signal SEL_MS_2. The another integrated circuit may configure the common boot loader 601 as a slave function in order to operate as a slave microcontroller unit according to the second selection signal SEL_MS_2. Here, the common boot loader 601 configured to perform a slave function may be defined as a "second boot loader 421".

Subsequently, if a function of the integrated circuit for a microcontroller unit is determined, firmware corresponding to the determined function may be written (S606).

For example, first firmware 412 may be stored in a first nonvolatile memory 410 accessible by the integrated circuit determined as a master function (i.e., the integrated circuit that becomes a master microcontroller unit). The first firmware 412 may include an algorithm corresponding to a master function, and may implement a master function for touch sensing together with the first boot loader 411.

In addition, second firmware 422 may be stored in a second nonvolatile memory 420 accessible by the integrated circuit determined as a slave function (i.e., the integrated circuit that becomes a slave microcontroller unit). The second firmware 422 may include an algorithm corresponding to a slave function, and may implement a slave function for touch sensing together with the second boot loader 421.

Steps S604 and S606 may be performed during the initial driving process of the integrated circuit. The firmware may be written only after the boot loader has been written at once and functions have been determined through selection signals SEL_MS_1 and SEL_MS_2. This makes it possible to simplify and unify the manufacturing process through a batch write process of the boot loader and a differential write process of the firmware.

Meanwhile, the boot loader may include identification data in a binary form indicating data characteristics. The fact that a plurality of boot loaders have the same identification data may indicate that the plurality of boot loaders have the same characteristic or that the plurality of boot loaders stems from the same source. Accordingly, the common boot loader 601 may also include identification data. Since both the first boot loader 411 and the second boot loader 421 originate from the common boot loader 601, they may include the same identification data.

Figure 7:
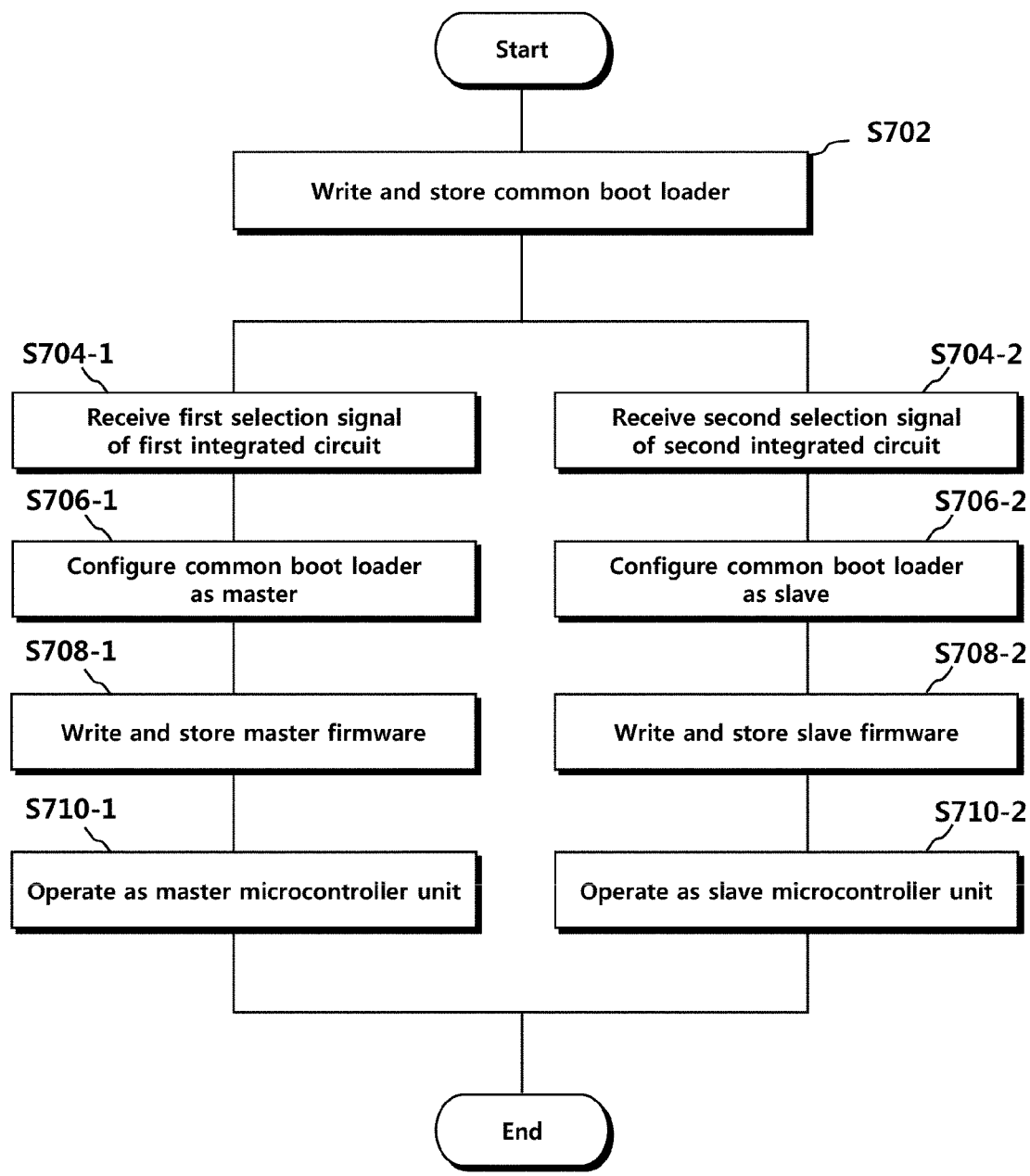
FIG. 7 is a flowchart illustrating a process in which an integrated circuit is configured and operates as a master or a slave according to an embodiment.

FIG. 7 is a flowchart illustrating a process in which an integrated circuit is configured and operates as a master or a slave according to an embodiment.

Referring to FIG. 7, as a boot loader and firmware are written, an integrated circuit may be configured and operate as a microcontroller unit performing a master function or a microcontroller unit performing a slave function.

A common boot loader capable of performing a plurality of functions may be stored in a nonvolatile memory (S702). The plurality of functions may include a master function and a slave function for touch sensing. The common boot loader may be written and stored in each nonvolatile memory.

For example, the common boot loader may be written and stored in a first nonvolatile memory accessible by a first integrated circuit that will operate as a master microcontroller unit later and a second nonvolatile memory accessible by a second integrated circuit that will operate as a slave microcontroller unit later.

The first integrated circuit may receive a first selection signal for determining a function of the first integrated circuit (S704-1). Here, the first selection signal may determine that the first integrated circuit functions as a master microcontroller unit. The first integrated circuit may configure the common boot loader such that the common boot loader performs a master function (S706-1). Master firmware in order for the first integrated circuit to function as a master microcontroller unit may be written and stored in the first nonvolatile memory (S708-1). The first integrated circuit may operate as a master microcontroller unit for touch sensing through the common boot loader configured as a master and the master firmware (S710-1).

The common boot loader may include a function of downloading firmware, and the first integrated circuit may download master firmware through communication with a host, and may write the same to the first nonvolatile memory.

In addition, the second integrated circuit may receive a second selection signal for determining the function of the second integrated circuit (S704-2). Here, the second selection signal may determine that the second integrated circuit functions as a slave microcontroller unit. The second integrated circuit may configure the common boot loader such that the common boot loader performs a slave function (S706-2). Slave firmware in order for the second integrated circuit to function as a slave microcontroller unit may be written and stored in the second nonvolatile memory (S708-2). The second integrated circuit may operate as a slave microcontroller unit for touch sensing through a common boot loader configured as a slave and the slave firmware (S710-2).

The common boot loader may include a function of downloading firmware, and the second integrated circuit may download slave firmware through communication with a host, and may write the same to the second nonvolatile memory.

Figure 8:
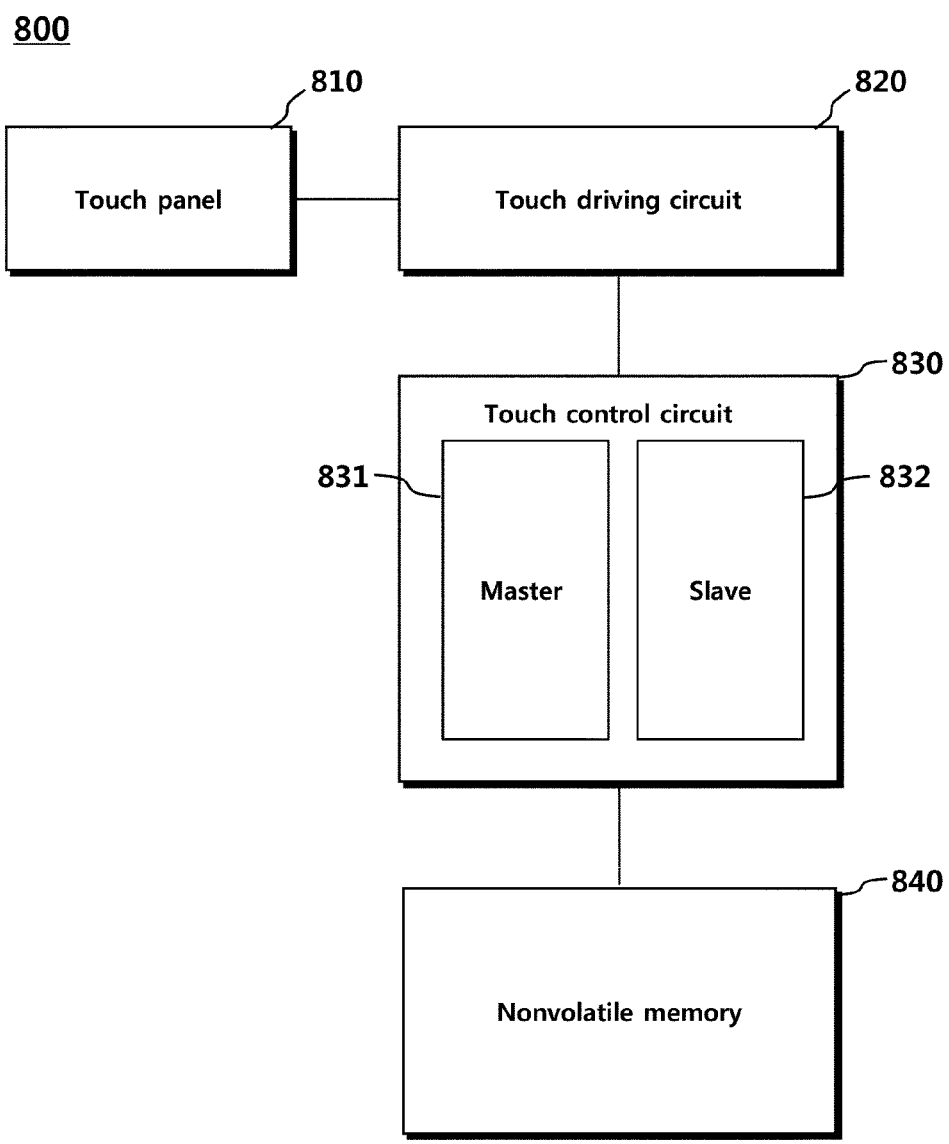
FIG. 8 is a block diagram of a touch sensing system according to an embodiment.

FIG. 8 is a block diagram of a touch sensing system according to an embodiment.

Referring to FIG. 8, a touch sensing system 800 may include a touch panel 810, a touch driving circuit 820, a touch control circuit 830, and a nonvolatile memory 840.

The touch sensing system 800 may be configured as circuits of the display device (see 100 in FIG. 1), which perform touch sensing. The touch panel 810 may be a set of touch electrodes receiving touch input on the panel, the touch driving circuit 820 may include a readout IC, and the touch control circuit 830 may include a microcontroller unit.

The touch panel 810 may receive a touch or proximity of an external object. The touch panel 810 may include a series of touch electrodes, and may share the touch electrodes with the display panel.

The touch driving circuit 820 may generate touch data indicating whether or not the touch or proximity is present. The touch driving circuit 820 may transmit the touch data to the touch control circuit 830.

The touch control circuit 830 may determine whether or not the touch or proximity is present. The touch control circuit 830 may calculate coordinates for the touch or proximity from the touch data.

The touch control circuit 830 may include a master touch control circuit 831 and a slave touch control circuit 832. The master touch control circuit 831 may perform a master function in touch sensing. The master touch control circuit 831 may control the slave touch control circuit 832, and may communicate with a host. In addition, the slave touch control circuit 832 may perform a slave function in touch sensing. The slave touch control circuit 832 may receive touch data from the touch driving circuit 820.

The nonvolatile memory 840 may store a boot loader that performs a plurality of functions for determining the touch or proximity, and firmware that performs any one of the plurality of functions. The nonvolatile memory 840 accessed by the master touch control circuit 831 may store a boot loader configured as a master function and firmware corresponding to the master function. The nonvolatile memory 840 accessed by the slave touch control circuit 832 may store a boot loader configured as a slave function and firmware corresponding to the slave function.

What is claimed is:

1. A touch sensing integrated circuit system comprising:
a first nonvolatile memory and a second nonvolatile memory configured to store a common boot loader which is capable of performing a master function and a slave function;
a first integrated circuit configured to configure the common boot loader as a first boot loader to operate as a master based on a first selection signal received from a host; and
a second integrated circuit configured to configure the common boot loader as a second boot loader to operate as a slave based on a second selection signal received from the host,
wherein the first boot loader downloads a first firmware to operate as a master, and the first firmware is stored in the first nonvolatile memory together with the first boot loader operating as the master, and
wherein the second boot loader downloads a second firmware to operate as a slave, and the second firmware is stored in the second nonvolatile memory together with the second boot loader operating as the slave.

2. The touch sensing integrated circuit system of claim 1, wherein the first integrated circuit and the second integrated circuit are microcontroller units (MCUs).

3. The touch sensing integrated circuit system of claim 1, wherein the first integrated circuit is configured to receive data on touch sensing from the second integrated circuit and to transmit data on touch coordinates to the host using the data on the touch sensing.

4. The touch sensing integrated circuit system of claim 3, wherein the first integrated circuit and the second integrated circuit are configured to generate data on the touch sensing for different areas in a touch panel.

5. The touch sensing integrated circuit system of claim 1, wherein the common boot loader comprises identification data in a binary form indicating characteristics.

6. The touch sensing integrated circuit system of claim 5, wherein the common boot loader configured as a master and the common boot loader configured as a slave comprise a same identification data.

7. The touch sensing integrated circuit system of claim 3, wherein the first integrated circuit and the second integrated circuit are configured to download the first firmware or the second firmware from the host.

8. A method for writing firmware to an integrated circuit system comprising a first nonvolatile memory, a first integrated circuit accessible to the first nonvolatile memory, a second nonvolatile memory, and a second integrated circuit accessible to the second nonvolatile memory, the method comprising:

storing a boot loader capable of performing a master function and a slave function in the first nonvolatile memory and the second nonvolatile memory, respectively;

causing the first integrated circuit to configure the boot loader stored in the first nonvolatile memory as a first boot loader to operate as a master in response to receiving a first selection signal from a host;

causing the second integrated circuit to configure the boot loader stored in the second nonvolatile memory as a second boot loader to operate as a slave in response to receiving a second selection signal from the host;

downloading a first firmware by the first boot loader, and storing the first firmware to operate as a master in the first nonvolatile memory; and downloading a second firmware by the second boot loader, and storing the second firmware to operate as a slave in the second nonvolatile memory.

9. The method of claim 8, wherein the boot loader comprises a common boot loader that is applicable to both the first integrated circuit and the second integrated circuit, and, storing the boot loader comprises storing the common boot loader in both the first nonvolatile memory and in the second nonvolatile memory at once.

10. The method of claim 8, wherein, storing the first firmware comprises storing the first firmware after the first integrated circuit has configured the boot loader stored in the first nonvolatile memory as the master, and, storing the second firmware comprises storing the second firmware after the second integrated circuit has configured the boot loader stored in the second nonvolatile memory as the slave.

* * * * *